US008626780B2

(12) United States Patent
Chien et al.

(10) Patent No.: US 8,626,780 B2
(45) Date of Patent: Jan. 7, 2014

(54) MULTIMEDIA PLAYING SYSTEM, APPARATUS FOR IDENTIFING A FILE AND, METHOD THEREOF

(75) Inventors: Chun-Chin Chien, Taoyuan (TW); Sheng-Shan Teng, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 387 days.

(21) Appl. No.: 12/830,970

(22) Filed: Jul. 6, 2010

(65) Prior Publication Data
US 2011/0102604 A1 May 5, 2011

(30) Foreign Application Priority Data
Nov. 3, 2009 (TW) ................................ 98137208 A

(51) Int. Cl.
G06F 17/30 (2006.01)
(52) U.S. Cl.
USPC ........................................................ 707/758
(58) Field of Classification Search
None
See application file for complete search history.

(56) References Cited

U.S. PATENT DOCUMENTS

2006/0153293 A1 7/2006 Hsu et al.
2006/0294058 A1* 12/2006 Zabback et al. .................. 707/2
2007/0038318 A1* 2/2007 Sakata ............................ 700/94
2007/0076959 A1 4/2007 Bressan
2007/0118480 A1* 5/2007 Ueda et al. ...................... 705/59
2008/0235724 A1 9/2008 Sassenscheidt et al.
2008/0260244 A1* 10/2008 Kaftory et al. ................ 382/165

FOREIGN PATENT DOCUMENTS

TW 2007/40197 10/2007
TW 2007/40214 10/2007

* cited by examiner

Primary Examiner — Rehana Perveen
Assistant Examiner — Alexander Khong
(74) Attorney, Agent, or Firm — Muncy, Geissler, Olds & Lowe, PLLC

(57) ABSTRACT

A multimedia playing system, an apparatus for identifying a file, and a method thereof are provided. The multimedia playing system comprises a display device, a sensing device, and an identification device. The display device is configured to display the file and has a predetermined area. A plurality of color tags adapted to be displayed on the predetermined area is attached to the file. The sensing device continuously senses the predetermined area to generate a sensed datum. The identification device is connected to the sensing device and receives the sensed data from the sensing device to determine a sensed color code representing each of the sensed data. The identification device further forms a sensed sequence by the sensed color codes and determines a piece of display information corresponding to the sensed sequence.

28 Claims, 5 Drawing Sheets

MULTIMEDIA PLAYING SYSTEM, APPARATUS FOR IDENTIFING A FILE AND, METHOD THEREOF

This application claims priority to Taiwan Patent Application No. 098137208 filed on Nov. 3, 2009.

CROSS-REFERENCES TO RELATED APPLICATIONS

Not applicable.

BACKGROUND OF THE INVENTION

1. Field of the Invention

The present invention provides a multimedia playing system, an apparatus for identifying a file, and a method thereof. In particular, the present invention provides an apparatus for identifying a file played on a display device of the multimedia playing system, the multimedia playing system, and a method thereof.

2. Descriptions of the Related Art

Liquid crystal display (LCD) technologies have been developed and found wider application over recent years. Aside from application in products such as personal computers, household television sets, and handheld apparatuses, LCD systems have also gradually been applied to the public media sector; for example, advertisements may be played using multimedia files on LCD systems in airports, rapid transit vehicles, department stores, hypermarkets, and other places. Accordingly, many manufacturers have placed greater efforts in searching the LCD system market for more applications of the LCD systems.

To ensure that a multimedia file is correctly played on the display device of an LCD system at a predetermined time point or that the multimedia file is correctly played according to the scheduled contents, some manufacturers currently monitor the display device by directly capturing frames by means of a charge coupled device (CCD) and obtaining the information of the multimedia files by means of an image analysis software. However, because the CCD must be installed at a distance of at least 3~5 meters from the display device to monitor the whole frame and the captured frames must be transmitted back to a remote host for image analysis, this kind of arrangement leads to high complexity and high costs.

According to the above descriptions, it is important to provide a solution capable of reducing both the complexity and cost necessary for monitoring an LCD system and expanding the application of LCD systems in the public media sector to improve the convenience in use and provide more diversified services.

SUMMARY OF THE INVENTION

An objective of the present invention is to provide a multimedia playing system. The multimedia playing system comprises a display device, a sensing device, and an identification device. The display device is configured to play a file and has a predetermined area. A plurality of color tags are attached to the file, the color tags are adapted to be displayed on the predetermined area, and each of the color tags corresponds to a color code. The sensing device is disposed to face the predetermined area and configured to continuously sense the predetermined area to generate a sensed datum. The identification device is connected to the sensing device and configured to store a color pattern, wherein the color pattern records at least one predetermined color sequence. The at least one predetermined color sequence corresponds to a piece of the playing information of the file and is composed of the color codes. The identification device is further configured to receive the sensed data from the sensing device to determine a sensed color code representing each of the sensed data, wherein each of the sensed color codes is one of the color codes. The identification device is further configured to store the sensed color code into a queue register until an amount of the sensed color codes stored in the queue register is equal to a predetermined quantity. A sensed color sequence is formed by the sensed color codes. The identification device is further configured to determine the piece of playing information corresponding to the sensed color sequence by comparing the sensed color sequence with the at least one predetermined color sequence.

Another objective of the present invention is to provide an apparatus for identifying a file played on a display device. The apparatus is adapted for the multimedia playing system described above. The display device has a predetermined area. A plurality of color tags is attached to the file, the color tags are adapted to be displayed on the predetermined area, and each of the color tags corresponds to a color code. The apparatus comprises a storage module, a transmission module, a queue register, and a process module. The storage module is configured to store a color pattern, wherein the color pattern records at least one predetermined color sequence. The at least one predetermined color sequence corresponds to a piece of playing information from the file and is composed of the color codes. The transmission module is configured to continuously receive a sensed datum from a sensing device, wherein the sensing device generates the sensed data by sensing the predetermined area. The process module is configured to continuously determine a sensed color code representing the sensed datum, wherein the sensed color code is one of the color codes. The process module is further configured to continuously store the sensed color code into the queue register until an amount of the sensed color codes stored in the queen register is equal to a predetermined quantity. A sensed color sequence is formed by the sensed color codes. The process module is further configured to determine the piece of playing information corresponding to the sensed color sequence by comparing the sensed color sequence with the at least one predetermined color sequence.

Yet a further objective of the present invention is to provide a method for identifying a file played on a display device. The method is adapted for the apparatus to identify a file described above. The display device has a predetermined area. A plurality of color tags is attached to the file, the color tags are adapted to be displayed on the predetermined area, and each of the color tags corresponds to a color code. The method is used with a color pattern, and the color pattern records at least one predetermined color sequence. The at least one predetermined color sequence corresponds to a piece of playing information of the file and is composed of the color codes. The method comprises the following steps: (a) receiving a sensed datum from a sensing device, wherein the sensing device generates the sensed data by sensing the predetermined area; (b) determining a sensed color code representing the sensed datum; (c) storing the sensed color code into a queue register; (d) iterating steps (a), (b), and (c) until an amount of the sensed color codes stored in the queue register is equal to a predetermined quantity, and a sensed color sequence is formed by the sensed color codes stored in the queue register; and (e) determining the piece of playing information corresponding to the sensed color sequence by comparing the sensed color sequence with the at least one predetermined color sequence.

The multimedia playing system of the present invention is adapted for an LCD display system. Because the multimedia playing system is able to obtain information of the file without the use of a CCD, the complexity and cost necessary for monitoring of the LCD system are significantly reduced, and thus, may be used conveniently to provide more diversified services.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The following embodiments are only provided to illustrate rather than to limit the present invention. It should be appreciated that in the following embodiments and the attached drawings, elements unrelated to the present invention are omitted from depiction; and dimensional relationships among the individual elements in the attached drawings are illustrated only for ease of understanding, but not to limit the actual scale.

Figure 1:
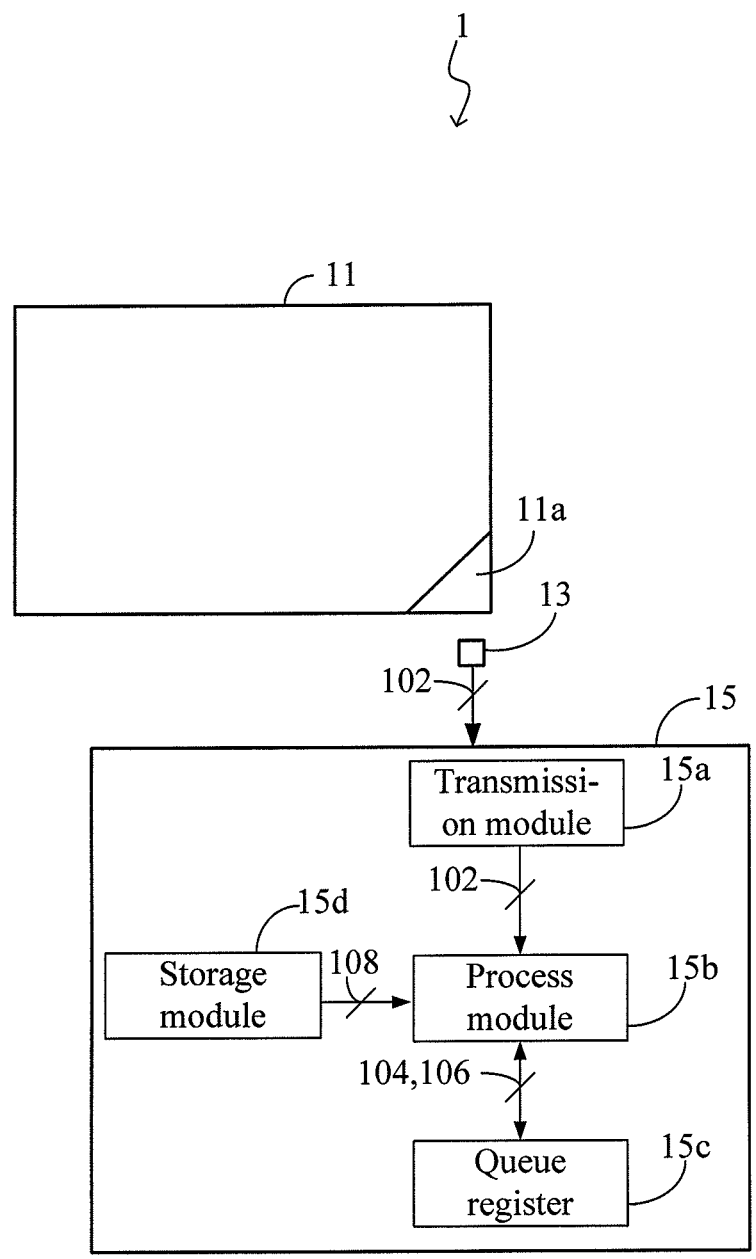
FIG. 1 is a schematic view of a multimedia playing system of the first embodiment.

FIG. 1 illustrates a schematic view of a multimedia playing system 1 according to a first embodiment of the present invention. The multimedia playing system 1 comprises a display device 11, a sensing device 13, and an identification device 15. The display device 11 is configured to play a file, which may be a multimedia file, for example, an advertisement or a movie. The display device 11 may be an LCD or a plasma display panel. The display device 11 has a predetermined area 11a, and a plurality of color tags adapted to be displayed on the predetermined area 11a is attached to the multimedia file. Each of the color tags corresponds to a color code. For example, the color tags may comprise a red tag, a blue tag, and a green tag. The red tag corresponds to a red code, the blue tag corresponds to a blue code, and the green tag corresponds to a green code. The sensing device 13 is disposed facing the predetermined area and configured to continuously sense the predetermined area 11a to generate a sensed datum 102 according to a sensing result. The sensed datum 102 may comprise a red composition datum, a green composition datum, and a blue composition datum.

The identification device 15 may be connected to the sensing device 13 either wirelessly or in a wired way. The identification device 15 comprises a transmission module 15a, a process module 15b, a queue register 15c, and a storage module 15d. The transmission module 15a is configured to receive the sensed datum 102 from the sensing device 13. The storage module 15d is configured to store a color pattern which records a predetermined color sequence 108. The predetermined color sequence 108 corresponds to a piece of playing information of the multimedia file and is composed of the color codes. For example, the predetermined color sequence 108 may be a red code, a blue code, a green code, a permutation of two codes or even a permutation of three codes. In other words, the predetermined color sequence 108 may be a permutation of more than one color code in which a color code may appear repeatedly in the permutation provided that adjacent color codes are not identical to each other; for example, "red", "red, blue", "red, blue, green" and, "red, blue, green, blue" are all permissible permutations of the color codes.

Additionally, the storage module 15d is further configured to store a red composition definition, a green composition definition and, a blue composition definition. The process module 15b is further configured to determine each of the sensed color codes 104 representing the sensed data 102 respectively by comparing the red composition datum, the green composition datum, and the blue composition datum of the sensed data 102 with the red composition definition, the green composition definition, and the blue composition definition. Then, the process module 15b is further configured to determine whether the sensed color code 104 representing the sensed datum is one of the color codes. If the sensed color code 104 is one of the color codes, it will be stored into the queue register 15c. Otherwise, if the sensed color code 104 is not one of the color codes, it will be discarded. It shall be noted that the process module 15b also determines whether the sensed color code 104 is identical to a prior sensed color code stored in the queue register 15c. If the answer is "yes", the process module 15b will delete the prior sensed color code stored in the queue register 15c and store the sensed color code 104 (i.e., the latest sensed color code that is determined) into the queue register 15c.

In more details, the process module 15b continuously receives the sensed data 102 and determines the sensed color codes 104 representing the sensed data 102. When an amount of the sensed color codes 104 stored in the queue register 15c is equal to a predetermined quantity, the process module 15b will compose the sensed color codes 104 into a sensed color sequence 106 so that by comparing the sensed color sequence 106 with the predetermined color sequence 108, the piece of playing information corresponding to the sensed color sequence 106 can be determined. Meanwhile, the process module 15b will also clear the sensed color codes 104 that have formed the sensed color sequence 106 from the queue register 15c to make room for storage of new sensed color codes 104. The piece of playing information may correspond to the start of playing the multimedia file, the end of playing the multimedia file, or any predetermined time point during the playing process. Thereby, a frame displayed on the display device may be monitored only according to the playing information representing the different color sequences. For example, if the multimedia file is an advertisement, then, by using the color sequence, the advertisement may be correctly monitored and played on the display device at a predetermined time point and the playing time of the advertisement on the display device may be calculated.

Figure 2:
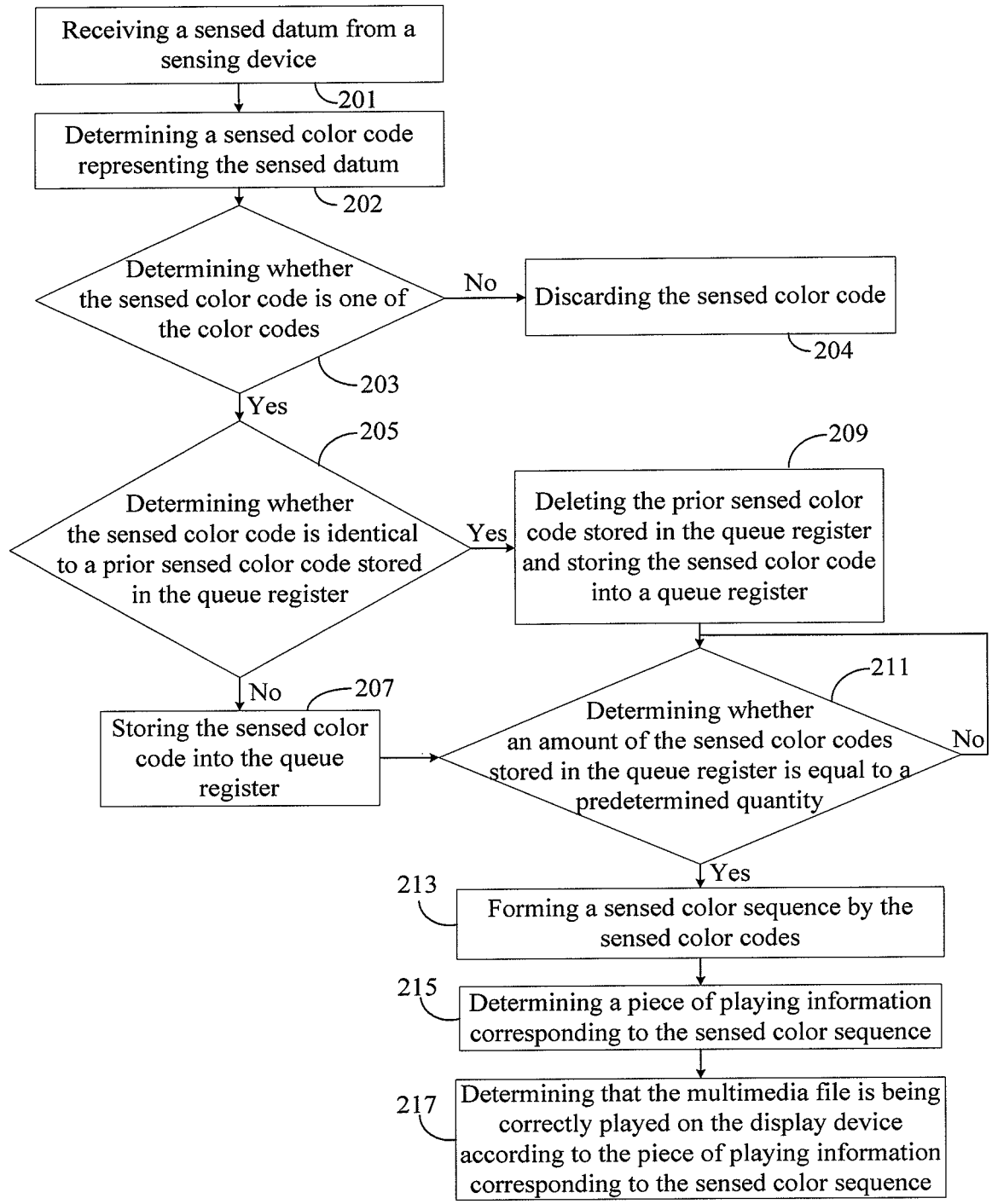
FIG. 2 is a flowchart of a method for identifying a multimedia file, which is adapted for the multimedia playing system of the first embodiment.

The second embodiment of the present invention is a method for identifying a multimedia file played on a display device, which is adapted for the identification device 15 described in the first embodiment. A flowchart of the method is depicted in FIG. 2. It shall be appreciated that in this embodiment, the display device has a predetermined area, and a plurality of color tags adapted to be displayed on the predetermined area is attached to the multimedia file. Each of the color tags corresponds to a color code, and the method is used with a color pattern that records a predetermined color sequence. The predetermined color sequence corresponds to a piece of playing information of the multimedia file and is composed of the color codes.

The method for identifying a multimedia file that is played on a display device is described as follows. Initially, step 201 is executed to receive a sensed datum from a sensing device. Then, step 202 is executed to determine the sensed color code representing the sensed datum by comparing the red composition datum, the green composition datum, and the blue composition datum with the red composition definition, the green composition definition, and the blue composition definition. Next, step 203 is executed to determine whether the sensed color code representing the sensed datum is one of the color codes. If the answer is "yes", then step 205 is executed to determine whether the sensed color code is identical to a prior sensed color code stored in the queue register. Otherwise, if the answer of step 205 is "no", then step 207 is executed to store the sensed color code into the queue register. Afterwards, step 211 is executed to determine whether an amount of the sensed color codes stored in the queue register is equal to a predetermined quantity. If the amount has reached the predetermined quantity, then step 213 is executed to form a sensed color sequence by the sensed color codes stored in the queue register. Finally, step 215 is executed to determine a piece of playing information corresponding to the sensed color sequence, and step 217 is executed to, according to the piece of playing information corresponding to the sensed color sequence, determine that the multimedia file is correctly played on the display device.

On the other hand, if it is determined in step 203 that the sensed color code representing the sensed datum is not one of the color codes, then step 204 is executed to discard the sensed color code. If it is determined in step 205 that the sensed color code is identical to the prior sensed color code stored in the queue register, then step 209 is executed to delete the prior sensed color code stored in the queue register and to store the sensed color code (i.e., the latest sensed color code that is determined) into a queue register.

It shall be noted that steps 201 to 205 are iteratively executed to receive a new sensed datum and determine a new sensed color code representing the new sensed datum. Steps 207 and 209 will be executed in response to step 205. In other words, if it is determined in step 211 that an amount of the sensed color codes stored in the queue register has not reached the predetermined quantity, step 211 will be iterated until the amount of sensed color codes stored in the queue register reaches the predetermined quantity, and then steps 213, 215, and 217 are executed in response to step 211.

Figure 3A:
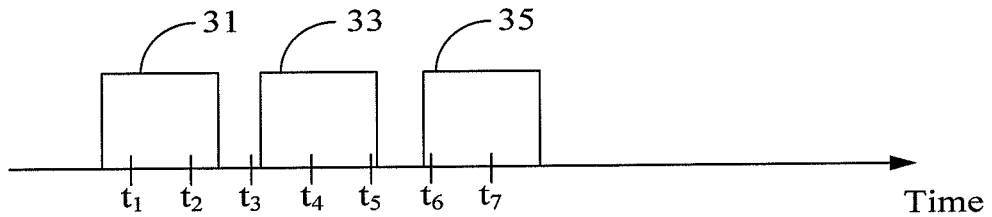
FIGS. 3A-3H are schematic views of an example of the present invention.
Figure 3B:
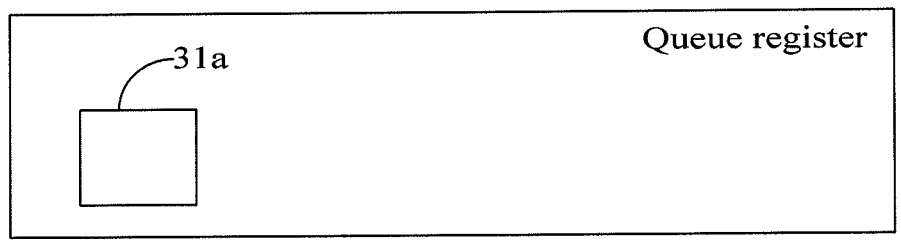
Figure 3C:
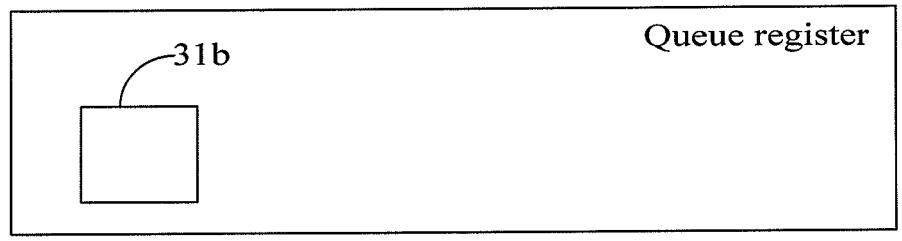
Figure 3D:
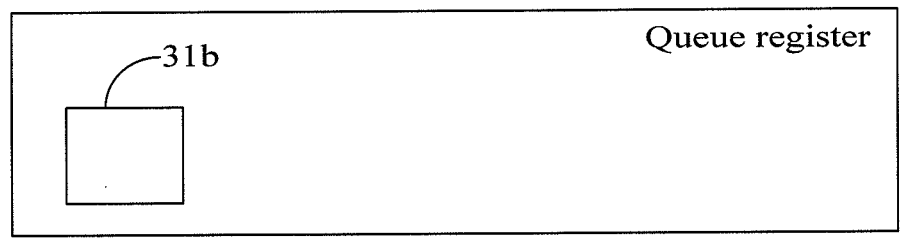
Figure 3E:
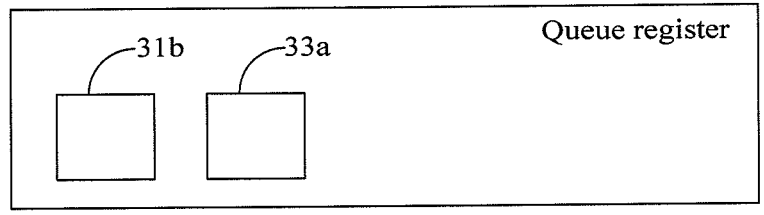
Figure 3F:
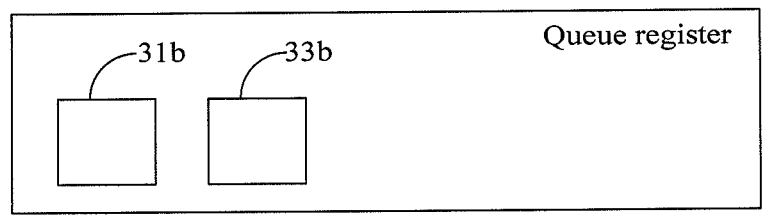
Figure 3G:
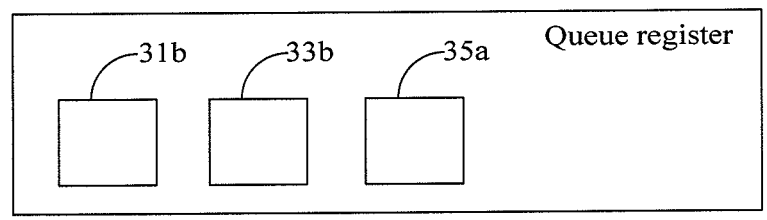
Figure 3H:
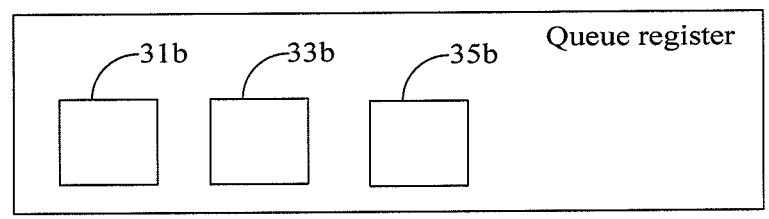

Hereinbelow, the present invention will be illustrated with reference to examples thereof. Here, it is assumed that the color codes stored in the storage module are red, blue, and green, so the color tags attached to the multimedia file may be a red tag 31, a blue tag 33, and a green tag 35. It is also assumed that the predetermined color sequence consists of a predetermined quantity of color tags, and here, consists of three color tags. In reference to FIGS. 3A-3H, FIG. 3A shows that the three color tags, including the red tag 31, the blue tag 33, and the green tag 35, appear at different time points. The sensing device senses the color tags at time points $t_1 \sim t_7$, which are equally separated, respectively to generate sensed data. At time point $t_1$, the process module determines that the sensed color code 31a representing the sensed datum is a red code, and then stores the sensed color code 31a into the queue register, as shown in FIG. 3B. At time point $t_2$, the process module determines that the sensed color code 31b representing the sensed datum is also a red code; however, because the sensed color code 31b is identical to the prior sensed color code 31a stored in the queue register, the process module must delete the sensed color code 31a from the queue register and, instead, store the sensed color code 31b into the queue register, as shown in FIG. 3C. At time point $t_3$, because no color tag exists at this time point, the process module determines that the sensed color code representing the sensed datum is not one of the color codes and, thus, discards the sensed color code, as shown in FIG. 3D. In this case, the queue register still has the sensed color code 31b stored therein; i.e., the status of the queue register is identical to that shown in FIG. 3C. Subsequently, at time points $t_4$ and $t_5$, the process module determines, respectively, that the sensed color code 33a representing a sensed datum and the sensed color code 33b representing a sensed datum are both blue codes, so the process module deletes the sensed color code 33a stored in the register at time point $t_4$ from the register and stores the sensed color code 33b into the register instead, as shown in FIGS. 3E-3F. Likewise, at time points $t_6$ and $t_7$, the process module determines, respectively, that the sensed color code 35a representing a sensed datum and the sensed color code 35b representing a sensed datum are both green codes, so the process module deletes the sensed color code 35a stored in the register at time point $t_4$ from the register and stores the sensed color code 35b into the register instead, as shown in FIGS. 3G-3H.

Figure 4:
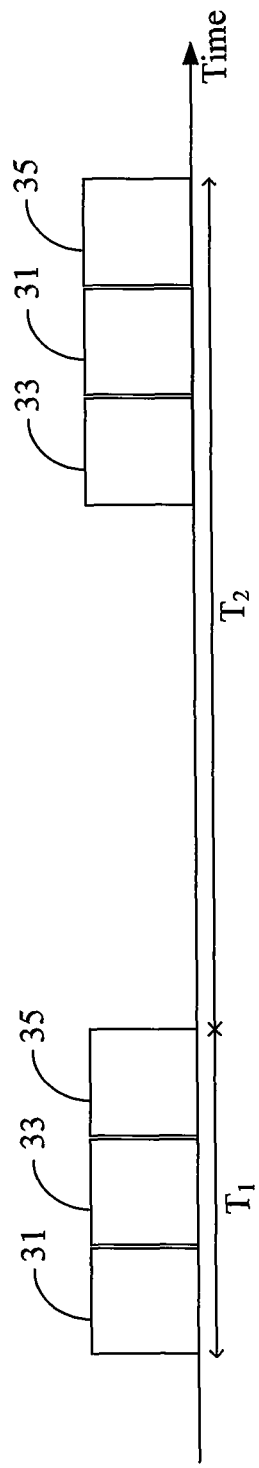
FIG. 4 is a schematic view of another example of the present invention.

FIG. 4 illustrates another example to exemplify how the present invention uses color tags to obtain a piece of playing information represented by the color tags. Initially, it is assumed that color codes stored in the storage module are red, blue, and green, so the color tags attached to the multimedia file may be a red tag 31, a blue tag 33, and a green tag 35. It is also assumed that the predetermined color sequence consists of a predetermined quantity of color tags, and here, consists of three color tags. Here, the color sequence of "red tag 31, blue tag 33, green tag 35" is used to represent the start of playing a multimedia file, and the color sequence of "blue tag 33, red tag 31, green tag 35" is used to represent the end of playing the multimedia file. Then, from the color sequence of "red tag 31, blue tag 33, green tag 35", a duration $T_1$ in which the color sequence appears is obtained. Finally, from the color sequence of "blue tag 33, red tag 31, green tag 35", a duration $T_2$ from the end of the color sequence of "red tag 31, blue tag 33, green tag 35" to the end of the color sequence of "blue tag 33, red tag 31, green tag 35" is obtained. Accordingly, by attaching these two color sequences to the multimedia file, the duration in which the multimedia file is played on the display device can be calculated to be approximately $T_1+T_2$.

In summary, the multimedia playing system of the present invention may be effectively applied to an LCD system. By attaching color tags to a multimedia file and by using a sensing device to sense the color tags instead of conventionally using a CCD to monitor the frame, both the complexity and cost necessary for monitoring the system are significantly reduced. Furthermore, because both the complexity and cost are reduced, the multimedia playing system of the present invention may make the LCD system more convenient to use, thereby providing more diversified services.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A method for identifying a file played on a display device, the display device having a predetermined area, a plurality of color tags being attached to the file, the color tags being adapted to be displayed on the predetermined area, each of the color tags corresponding to a color code, the method being used with a color pattern, the color pattern recording at least one predetermined color sequence, the at least one predetermined color sequence corresponding to a piece of playing information of the file and being composed of the color codes, the method comprising the following steps of:

(a) receiving a sensed datum from a sensing device;
(b) determining a sensed color code representing the sensed datum, wherein the sensed color code is one of the color codes;
(c) storing the sensed color code into a queue register;
(d) iterating steps (a), (b), and (c) until an amount of the sensed color codes stored in the queue register is equal to a predetermined quantity, and a sensed color sequence being formed by the sensed color codes stored in the queue register; and
(e) determining the piece of playing information corresponding to the sensed color sequence by comparing the sensed color sequence with the at least one predetermined color sequence;

wherein the sensing device generates the sensed data by sensing the predetermined area.

2. The method as claimed in claim 1, further comprising the following steps of:

(f) determining that the sensed color code is not one of the color codes; and
(g) discarding the sensed color code based on the determination result of the step (f).

3. The method as claimed in claim 1, wherein the at least one predetermined color sequence is composed of the predetermined quantity of the color codes.

4. The method as claimed in claim 1, wherein each of the sensed data comprises a red composition datum, a green composition datum, and a blue composition datum.

5. The method as claimed in claim 4, wherein the method is used with a red composition definition, a green composition definition, and a blue composition definition, the step (b) determines the sensed color code representing the sensed datum by comparing the red composition datum, the green composition datum, and the blue composition datum with the red composition definition, the green composition definition, and the blue composition definition.

6. The method as claimed in claim 1, further comprising the following steps of:

determining that the sensed color code is identical to a prior sensed color code stored in the queue register after the step (b); and
deleting the prior sensed color code stored in the queue register.

7. The method as claimed in claim 1, wherein the piece of playing information corresponding to the at least one predetermined color sequence represents one of a message of starting a play and a message of ending a play.

8. The method as claimed in claim 7, further comprising the following steps of:

calculating a playing time of the file played on the display device according to the piece of playing information corresponding to the sensed color sequence.

9. The method as claimed in claim 1, further comprising the following steps of:

determining that the file is correctly played on the display device according to the piece of playing information corresponding to the sensed color sequence.

10. An apparatus for identifying a file played on a display device, the display device having a predetermined area, a plurality of color tags being attached to the file, the color tags being adapted to be displayed on the predetermined area, each of the color tags corresponding to a color code, the apparatus comprising:

a storage module, being configured to store a color pattern, the color pattern recording at least one predetermined color sequence, the at least one predetermined color sequence corresponding to a piece of playing information of the file and being composed of the color codes;
a transmission module, being configured to continuously receive a sensed datum from a sensing device;
a queue register; and
a process module, being configured to continuously determine a sensed color code representing the sensed datum, the sensed color code being one of the color codes, the process module being further configured to continuously store the sensed color code into the queue register until an amount of the sensed color codes stored in the queen register is equal to a predetermined quantity, a sensed color sequence being formed by the sensed color codes, and the process module being further configured to determine the piece of playing information corresponding to the sensed color sequence by comparing the sensed color sequence with the at least one predetermined color sequence;

wherein the sensing device generates the sensed data by sensing the predetermined area.

11. The apparatus as claimed in claim 10, wherein the process module is further configured to determine that the sensed color code is not one of the color codes and discard the sensed color code based on the determination of the sensed color code being not one of the color codes.

12. The apparatus as claimed in claim 10, wherein the at least one predetermined color sequence is composed of the predetermined quantity of the color codes.

13. The apparatus as claimed in claim 10, wherein each of the sensed data comprises a red composition datum, a green composition datum, and a blue composition datum.

14. The apparatus as claimed in claim 13, wherein the storage module is further configured to store a red composition definition, a green composition definition, and a blue composition definition, the process module determines the sensed color code representing the sensed datum by comparing the red composition datum, the green composition datum, and the blue composition datum with the red composition definition, the green composition definition, and the blue composition definition.

15. The apparatus as claimed in claim 10, wherein the process module is further configured to determine that the sensed color code is identical to a prior sensed color code stored in the queue register and delete the prior sensed color code stored in the queue register after determining the sensed color code representing the sensed datum.

16. The apparatus as claimed in claim 10, wherein the piece of playing information corresponding to the predetermined color sequence represents one of a message of starting a play and a message of ending a play.

17. The apparatus as claimed in claim 16, wherein the process module is further configured to calculate a playing time of the file played on the display device according to the piece of playing information corresponding to the sensed color sequence.

18. The apparatus as claimed in claim 10, wherein the process module is further configured to determine that the file is correctly played on the display device according to the piece of playing information corresponding to the sensed color sequence.

19. A multimedia playing system, comprising:
- a display device, having a predetermined area and being configured to play a file, a plurality of color tags being attached to the file, the color tags being adapted to be displayed on the predetermined area, each of the color tags corresponding to a color code;
- a sensing device, being disposed to face the predetermined area and configured to continuously sense the predetermined area to generate a sensed datum; and
- an identification device, being connected to the sensing device and configured to store a color pattern, the color pattern recording at least one predetermined color sequence, the at least one predetermined color sequence corresponding to a piece of playing information of the file and being composed of the color codes, the identification device being further configured to receive the sensed data from the sensing device, the identification device being further configured to determine a sensed color code representing each of the sensed data, each of the sensed color codes being one of the color codes, the identification device being further configured to store the sensed color code into a queue register until an amount of the sensed color codes stored in the queue register is equal to a predetermined quantity, a sensed color sequence being formed by the sensed color codes, the identification device being further configured to determine the piece of playing information corresponding to the sensed color sequence by comparing the sensed color sequence with the at least one predetermined color sequence.

20. The multimedia playing system as claimed in claim 19, wherein the identification device is further configured to determine that the sensed color code is not one of the color codes and discard the sensed color code based on the determination of the sensed color code being not one of the color codes.

21. The multimedia playing system as claimed in claim 19, wherein the at least one predetermined color sequence is composed of the predetermined quantity of the color codes.

22. The multimedia playing system as claimed in claim 19, wherein each of the sensed data comprises a red composition datum, a green composition datum, and a blue composition datum.

23. The multimedia playing system as claimed in claim 22, wherein the identification device is further configured to store a red composition definition, a green composition definition, and a blue composition definition the identification device determines the sensed color code representing the sensed datum by comparing the red composition datum, the green composition datum, and the blue composition datum with the red composition definition, the green composition definition, and the blue composition definition.

24. The multimedia playing system as claimed in claim 19, wherein the identification device is further configured to determine that the sensed color code is identical to a prior sensed color code stored in the queue register and delete the prior sensed color code stored in the queue register after determining the sensed color code representing the sensed datum.

25. The multimedia playing system as claimed in claim 19, wherein the identification device is further configured to calculate a playing time of the file played on the display device according to the piece of playing information corresponding to the sensed color sequence.

26. The multimedia playing system as claimed in claim 19, wherein the identification device is further configured to determine that the file is correctly played on the display device according to the piece of playing information corresponding to the sensed color sequence.

27. The multimedia playing system as claimed in claim 19, wherein the piece of playing information corresponding to the predetermined color sequence represents one of a message of starting a play and a message of ending a play.

28. The multimedia playing system as claimed in claim 19, wherein the identification device is connected to the sensing device by one of a wireless way and a wired way.

* * * * *